US008966886B2

(12) United States Patent
Nakamura

(10) Patent No.: US 8,966,886 B2
(45) Date of Patent: Mar. 3, 2015

(54) EXHAUST APPARATUS FOR INTERNAL COMBUSTION ENGINE

(71) Applicant: Honda Motor Co., Ltd., Tokyo (JP)

(72) Inventor: Kenichiro Nakamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 87 days.

(21) Appl. No.: 13/768,603

(22) Filed: Feb. 15, 2013

(65) Prior Publication Data

US 2013/0255226 A1 Oct. 3, 2013

(30) Foreign Application Priority Data

Mar. 30, 2012 (JP) ................................. 2012-082935

(51) Int. Cl.
| | |
|---|---|
| *F02B 27/02* | (2006.01) |
| *F01N 1/00* | (2006.01) |
| *F01N 3/00* | (2006.01) |
| *F01N 1/06* | (2006.01) |
| *F01N 13/08* | (2010.01) |
| *F02B 27/04* | (2006.01) |
| *F02D 9/04* | (2006.01) |

(52) U.S. Cl.
CPC .. *F01N 3/00* (2013.01); *F01N 1/06* (2013.01); *F01N 2210/02* (2013.01); *F01N 13/08* (2013.01); *F02B 27/04* (2013.01); *F01N 2240/36* (2013.01); *F01N 2590/04* (2013.01); *F02D 9/04* (2013.01); *Y02T 10/146* (2013.01)
USPC .................... 60/313; 60/312; 60/323; 60/324

(58) Field of Classification Search
CPC ....... F01N 1/06; F01N 13/08; F01N 2210/02; F01N 2240/36; F01N 2590/04; F02B 27/04; F02D 9/04
USPC ............................ 60/287, 312, 313, 323, 324
See application file for complete search history.

(56) References Cited

U.S. PATENT DOCUMENTS

| | | | | |
|---|---|---|---|---|
| 4,840,029 | A | * | 6/1989 | Sakurai et al. .................. 60/313 |
| 5,010,731 | A | * | 4/1991 | Onishi ............................ 60/313 |
| 5,152,138 | A | * | 10/1992 | Tanabe et al. .................... 60/313 |
| 7,913,796 | B2 | * | 3/2011 | Nishino ......................... 180/309 |
| 2001/0035009 | A1 | * | 11/2001 | Nakayasu et al. ............... 60/324 |

FOREIGN PATENT DOCUMENTS

JP 2-28514 U 2/1990

* cited by examiner

*Primary Examiner* — Audrey K Bradley
(74) *Attorney, Agent, or Firm* — Birch, Stewart, Kolasch & Birch, LLP

(57) ABSTRACT

An exhaust apparatus for an internal combustion engine wherein an on-off gate valve and a driving source therefor are not required for each bypass pipe. The exhaust apparatus includes a plurality of exhaust pipes extending independently from each other individually from a plurality of exhaust ports. Bypass paths communicate the exhaust pipes with each other in a region wherein the exhaust pipes are independent of each other. The bypass paths are opened or closed to control an exhaust characteristic. A plurality of bypass paths are provided and a bypass joining section at which the bypass paths are joined so as to be positioned in parallel to and in the neighborhood with each other is provided. At the bypass joining section, a single on-off valve that opens and closes the bypass paths simultaneously, and a single actuator for driving the on-off valve to open and close are provided.

20 Claims, 13 Drawing Sheets

US 8,966,886 B2

EXHAUST APPARATUS FOR INTERNAL COMBUSTION ENGINE

CROSS-REFERENCE TO RELATED APPLICATIONS

The present application claims priority under 35 USC 119 to Japanese Patent Application No. 2012-082935 filed Mar. 30, 2012 the entire contents of that are hereby incorporated by reference.

BACKGROUND OF THE INVENTION

1. Field of the Invention

The present invention relates to an exhaust apparatus for an internal combustion engine. More particularly, to an exhaust apparatus for a multi-cylinder internal combustion engine.

2. Description of Background Art

It is known in regard to an internal combustion engine that a dynamic effect of such as inertia or pulsation of exhaust gas flowing in an exhaust pipe has an influence on the volumetric efficiency of the internal combustion engine. A multi-cylinder internal combustion engine has been proposed wherein the dynamic effect is applied. In particular, in the multi-cylinder internal combustion engine, exhaust pipes extending from corresponding cylinders are joined together at a position of a suitable length. Further, the exhaust timings of the cylinders are displaced from each other (actually the ignition timings of the cylinders are displaced from each other) so that a dynamic effect of pulsation or the like obtained from one of the exhaust pipes acts upon the other side cylinder through the exhaust pipe to achieve improvement of the volumetric effect of the other side cylinder.

In this instance, the volumetric efficiency differs depending upon the rotational speed of the internal combustion engine, and in a rotational speed range adapted to the set exhaust system, the aforementioned dynamic effect acts effectively to raise the volumetric efficiency. However, in some rotational speed range, the dynamic effect and the exhaust timing are sometimes displaced to conversely give rise to a drop of the volumetric efficiency. This is because, if the exhaust system is set in shape and dimension so that an effective dynamic effect may be obtained in a high rotational speed range, then when the rotational speed of the internal combustion engine reaches a medium rotational speed range, good matching between the exhaust timing and the dynamic effect is lost. This results in a drop of the volumetric effect of the internal combustion engine, and consequently, a phenomenon that the output power of the internal combustion engine drops in the medium rotational speed range. Therefore, a technique has conventionally been proposed to provide a changeover valve at the joining region of the exhaust pipes. The changeover valve is changed over in response to the rotational speed of the internal combustion engine to change the joining mode of the exhaust pipes so that a pulsation effect of exhaust gas in the rotational speed range in that the output power drops is canceled thereby to moderate the phenomenon that the output power drops.

As a measure for changing the joining mode of the exhaust system, a technology is disclosed, for example, in Japanese Utility Model Laid-Open No. Hei 2-28514. According to this technology, a four-cylinder internal combustion engine includes a bypass pipe that communicates each two of the exhaust pipes of a four-cylinder internal combustion engine with each other in a region wherein the four exhaust pipes are independent of each other. An on-off gate valve is provided in the inside of each bypass pipe and is driven to open and close.

The bypass pipes are disposed at positions displaced forwardly and backwardly from each other to avoid interference therebetween and include the two on-off gate valves, and also two driving sources.

In this manner, in a conventional exhaust apparatus of the type described, an on-off gate valve is provided for each bypass pipe that communicates exhaust pipes with each other. Further, since also a driving source for driving an on-off gate valve is required for each of the on-off gate valves, there is a problem wherein an increase in the number of manufacturing steps is needed together with an increase in the cost and an increase in the number of parts.

SUMMARY AND OBJECTS OF THE INVENTION

The present invention has been made in view of such a situation as described above, and it is an object of an embodiment of the present invention to provide an exhaust apparatus for an internal combustion engine wherein an on-off gate valve and a driving source therefor are not required for each bypass pipe. Consequently an increase in the number of parts can be suppressed.

According to an embodiment of the present invention, there is provided an exhaust apparatus for an internal combustion engine that includes a plurality of exhaust pipes extending independently from each other individually from a plurality of exhaust ports, and a bypass path that communicates the exhaust pipes with each other in a region wherein the exhaust pipes are independent of each other, the bypass path being opened or closed to control an exhaust characteristic, wherein a plurality of bypass paths are provided and a bypass joining section where the bypass paths are joined so as to be positioned in parallel to and in the neighborhood with each other is provided. At the bypass joining section, a single on-off valve having a center of rotation positioned on a boundary between the bypass paths and configured to open and close the bypass paths simultaneously, and a single actuator for driving the on-off valve to open and close are provided.

According to an embodiment of the present invention, the exhaust apparatus for an internal combustion engine is configured such that a partition inner wall is provided in the inside of the bypass joining section to form the bypass paths, and the on-off valve includes a flap portion corresponding to a shape of a cross section of the bypass paths and a single rotational shaft for rotating the flap portion.

According to an embodiment of the present invention, the exhaust apparatus for an internal combustion engine is configured such that the flap portion includes a pair of flap portion halves disposed on the opposite sides across the rotational shaft, and the flap portion halves individually correspond for opening and closing movement to the bypass paths.

According to an embodiment of the present invention, the exhaust apparatus for an internal combustion engine is configured such that the bypass joining section includes a circular pipe body portion in the form of a cylindrical pipe, and the flap portion is formed as a disk corresponding to an inner diameter of the circular pipe body portion.

According to an embodiment of the present invention, the exhaust apparatus for an internal combustion engine is configured such that the rotational shaft of the on-off valve is positioned on an extension plane of the two partition inner walls provided in a juxtaposed relationship from each other.

According to an embodiment of the present invention, the exhaust apparatus for an internal combustion engine is configured such that the partition inner wall has a slit formed from partition inner wall end edges with the rotational shaft being disposed in the slit and the flap portion and the partition inner wall end edges contact with each other in a state wherein the on-off valve is closed.

According to an embodiment of the present invention, the exhaust apparatus for an internal combustion engine is configured such that the partition inner wall end edges are provided at an end of bent or curved slit forming portions that do not contact with the rotational shaft.

According to an embodiment of the present invention, the exhaust apparatus for an internal combustion engine is configured such that the flap portion of the on-off valve is configured for close contact with the partition inner walls positioned on the opposite sides of the rotational shaft.

According to an embodiment of the present invention, the exhaust apparatus for an internal combustion engine is configured such that the partition inner walls positioned on the opposite sides of the rotational shaft are provided in a spaced relationship from each other by an amount corresponding to the thickness of the flap portion in a thicknesswise direction.

According to an embodiment of the present invention, the exhaust apparatus for an internal combustion engine is configured such that the rotational shaft of the on-off valve is disposed in the slit of the partition inner walls, and the partition inner wall end edges that configure the slit and the flap portion of the on-off valve are spaced away from each other in a closed state of the on-off valve.

According to an embodiment of the present invention, there is provided an exhaust apparatus for an internal combustion engine that includes a plurality of exhaust pipes extending independently from each other individually from a plurality of exhaust ports, and a bypass path that communicates the exhaust pipes with each other in a region wherein the exhaust pipes are independent of each other, the bypass path being opened or closed to control an exhaust characteristic. A plurality of bypass paths are provided and a bypass joining section wherein the bypass paths are joined so as to be in the same neighborhood with each other. At the bypass joining section, a single on-off valve configured to open and close the bypass paths simultaneously and a single actuator for driving the on-off valve to open and close are provided. A partition inner wall is provided in the inside of the bypass joining section such that the bypass paths are formed in the inside of the bypass joining section and the on-off valve has plate-like flap portions that correspond to a shape of a cross section of the bypass paths and open and close the bypass paths and a single rotational shaft for rotating the flap portions, and the rotational shaft is provided so as to extend through the partition inner wall in a direction crossing with the partition inner wall.

According to an embodiment of the present invention, since the bypass joining section that joins the bypath paths to one place is provided, those on-off valves that can open and close the bypass paths at the same time can be concentrated to one place such that they are formed as a single on-off value. Further, the single on-off valve can be driven by a single actuator. Accordingly, there is no necessity to provide a number of actuators equal to the number of bypass paths. Consequently, the number of parts can be reduced and an increase in the cost can be suppressed.

According to an embodiment of the present invention, a region wherein a plurality of bypass paths neighbor with each other is formed by the partition inner wall provided in the inside of the bypass joining section. Further, the partition inner wall includes the single rotational shaft for rotating the plate-like flap portion corresponding to the shape of a cross section of the bypass paths. Therefore, the bypass paths can be opened or closed simultaneously by the flap portion that is operated by the single rotational shaft, and only the single actuator is required to drive the rotational shaft. Consequently, simplification of the apparatus can be achieved.

According to an embodiment of the present invention, the paired flap portion halves of the flap portion disposed on the opposite sides across the rotational shaft individually correspond for opening and closing movement to the bypass paths. Therefore, not only the structure of the on-off valve is simplified, but also even the single on-off valve can open and close the bypass paths individually by the respective flap portion halves. Also it is possible to form the flap portion halves in individually different shapes.

According to an embodiment of the present invention, the region of the bypass joining section wherein the on-off valve is provided is formed from a cylindrical pipe and the flap portion of the on-off valve is formed in a shape of a disk corresponding to the shape of the cross section of the cylindrical pipe. Therefore, since the on-off valve can be formed in a shape of a disk having general versatility, it can be readily manufactured at a low cost. Further, since the on-off valve is simple in shape, it can be formed with a high degree of accuracy, and high sealability of the bypass paths can be assured.

According to an embodiment of the present invention, since the rotational shaft of the on-off valve is positioned on the extension plane of the partition inner walls, in the open state of the on-off valve, the rotational shaft and the flap portion can be positioned so as to extend along the partition inner walls. Consequently, a projecting structure that obstructs a flow in the bypass paths can be suppressed. Accordingly, a good flow of exhaust gas in the bypass paths can be assured.

According to an embodiment of the present invention, since, in the closed state of the on-off valve, the flap portion and the partition inner wall end edges contact with each other, the position of the on-off valve can be restricted in the closed state of the bypass paths. Consequently, a special member for restricting the rotational position of the on-off valve is not required. Therefore, the configuration can be simplified. Further, by the contact between the flap portion and the partition inner wall end edges, high sealability upon closing of the on-off valve can be assured.

According to an embodiment of the present invention, the partition inner wall end edges are provided at the end of bent or curved slit forming portions that do not contact with the rotational shaft. Therefore, the partition inner wall end edges of the partition inner walls are disposed at a position at which they do not interfere with the rotational shaft and can contact with the flap portion. Consequently, effective restriction against rotation can be achieved.

According to an embodiment of the present invention, the flap portion is configured for close contact with the partition inner walls positioned on the opposite sides of the rotational shaft. Therefore, the partition inner walls can carry out position restriction when the on-off valve is fully open. Further, the flap portion can be prevented from projecting into the bypass paths so that it may not obstruct a flow of exhaust gas. Further, since the flap portion closely contacts with the partition inner walls to fully close the slit, high sealability between the bypass paths when the on-off valve is fully open can be assured.

According to an embodiment of the present invention, the partition inner walls positioned on the opposite sides of the rotational shaft are provided in a spaced relationship from each other by an amount corresponding to the thickness of the flap portion in a thicknesswise direction. Therefore, the flap portion and the partition inner walls can be made to contact closely with each other only by forming them in a parallel and flat structure. Consequently, high sealability between the bypass paths when the on-off valve is fully open can be assured.

According to an embodiment of the present invention, the flap portion and the partition inner wall end edges are configured so as to be spaced away from each other in the closed state of the on-off valve. Therefore, the communication form of the bypass paths can be changed to change the exhaust characteristic easily by a very simple configuration wherein the on-off valve is rotated.

According to an embodiment of the present invention, the rotational shaft of the on-off valve is provided so as to extend through the partition inner wall portion in a direction wherein an axial line of rotation thereof crosses with the partition inner wall portion. Therefore, the plurality of flap portions can be operated by the single rotational shaft. Further, since the rotational shaft is configured so as to extend through the partition inner wall, the sealability of the bypass paths formed by the partition inner wall is assured and independence of the bypass paths can be maintained. Further, according to the present on-off valve, even if the number of bypass paths is three or more, opening/closing of the bypass paths can be carried out by the single on-off value. Further, according to the present invention, since the rotational axis of the on-off value is configured so as to extend through the plurality of bypass paths, even in the case of a structure wherein a plurality of bypass paths are not juxtaposed in parallel to each other, simultaneous opening/closing of the bypass paths can be carried out.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following, embodiments of the present invention are described.

A motorcycle that is an example of a saddle type vehicle in the present embodiment is described with reference to FIGS. 1 to 7.

In the embodiments described below, the expressions of directions such as forward and backward, leftward and rightward, and upward and downward directions herein are those as viewed from a vehicle body of the motorcycle. Further, in viewing the accompanying drawings, each figure is to be viewed in the direction of reference symbols therein. Further, as regards expressions of directions in the figures, Fr represents the vehicle body forward direction, Rr the vehicle body rearward direction, Up the vehicle body upward direction, DW the vehicle body downward direction, R the vehicle body right side, and L the vehicle body left side.

Figure 1:
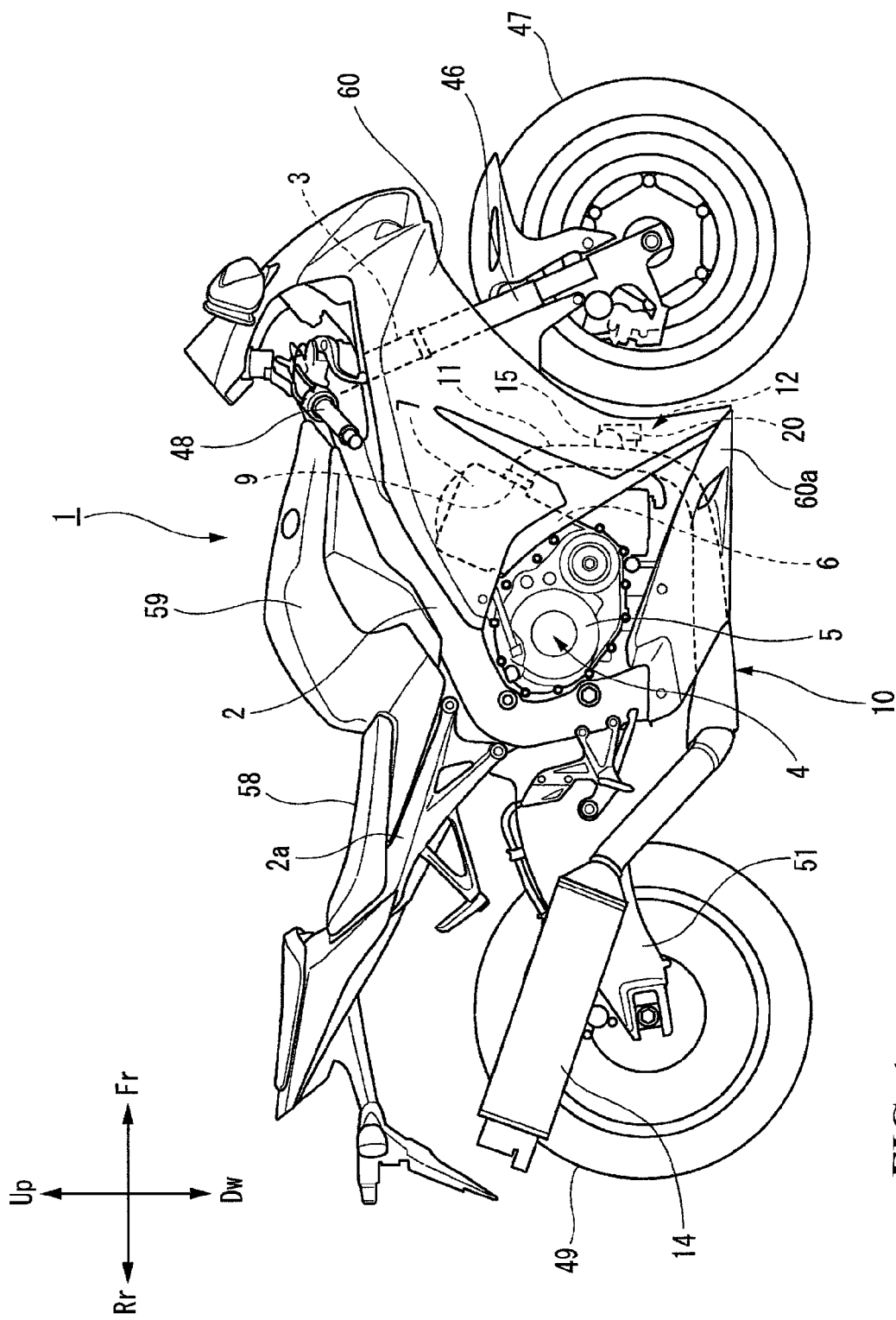
FIG. 1 is a right side elevational view of a saddle type vehicle according to a first embodiment that incorporates an internal combustion engine (engine) according to the present invention.

As shown in FIG. 1, the motorcycle 1 of the present embodiment includes various members attached to a vehicle body frame centered at a main frame 2 extending obliquely rearwardly downwardly from a head pipe 3 at a front portion of a vehicle body. In particular, an engine 4 that is an internal combustion engine is suspended on the lower side of the main frame 2, and a rear portion of the main frame 2 is curved downwardly of the vehicle body. Further, a rear frame 2a is connected to the rear end of the main frame 2 and extends rearwardly of the vehicle body, and a seat 58 and a rear fender are attached to the rear frame 2a. Further, a fuel tank 59 is provided forwardly of the seat 58. Further, a left and right pair of front forks 46 are provided on the lower side of the head pipe 3 and support a front wheel 47 for rotation thereon with a handlebar 48 for operation being connected to the upper side of the head pipe 3.

Further, a rear wheel 49 is provided on the lower side of the rear frame 2a on the rear of the vehicle body. The rear wheel 49 is supported suitably on a swing arm 51, and output power of the engine 4 is transmitted to the rear wheel 49 through a drive chain or the like.

In the motorcycle 1 of the present embodiment, the engine 4 is a four-cylinder engine (refer to FIG. 3) and includes a crankcase 5, a cylinder block 6 extending substantially upwardly from a front portion of the crankcase 5, and a cylinder head 7 connected to an upper portion of the cylinder block 6. The cylinder block 6 includes pistons accommodated for back and forth movement in the cylinders thereof. Meanwhile, in the crankcase 5, a crankshaft connected to the pistons through connecting rods and an output power shaft of the engine are supported. Further, a crank mechanism, a speed change gear and so forth that configure a power transmitting mechanism between the crankshaft and the output power shaft is accommodated in the crankcase 5.

Figure 2:
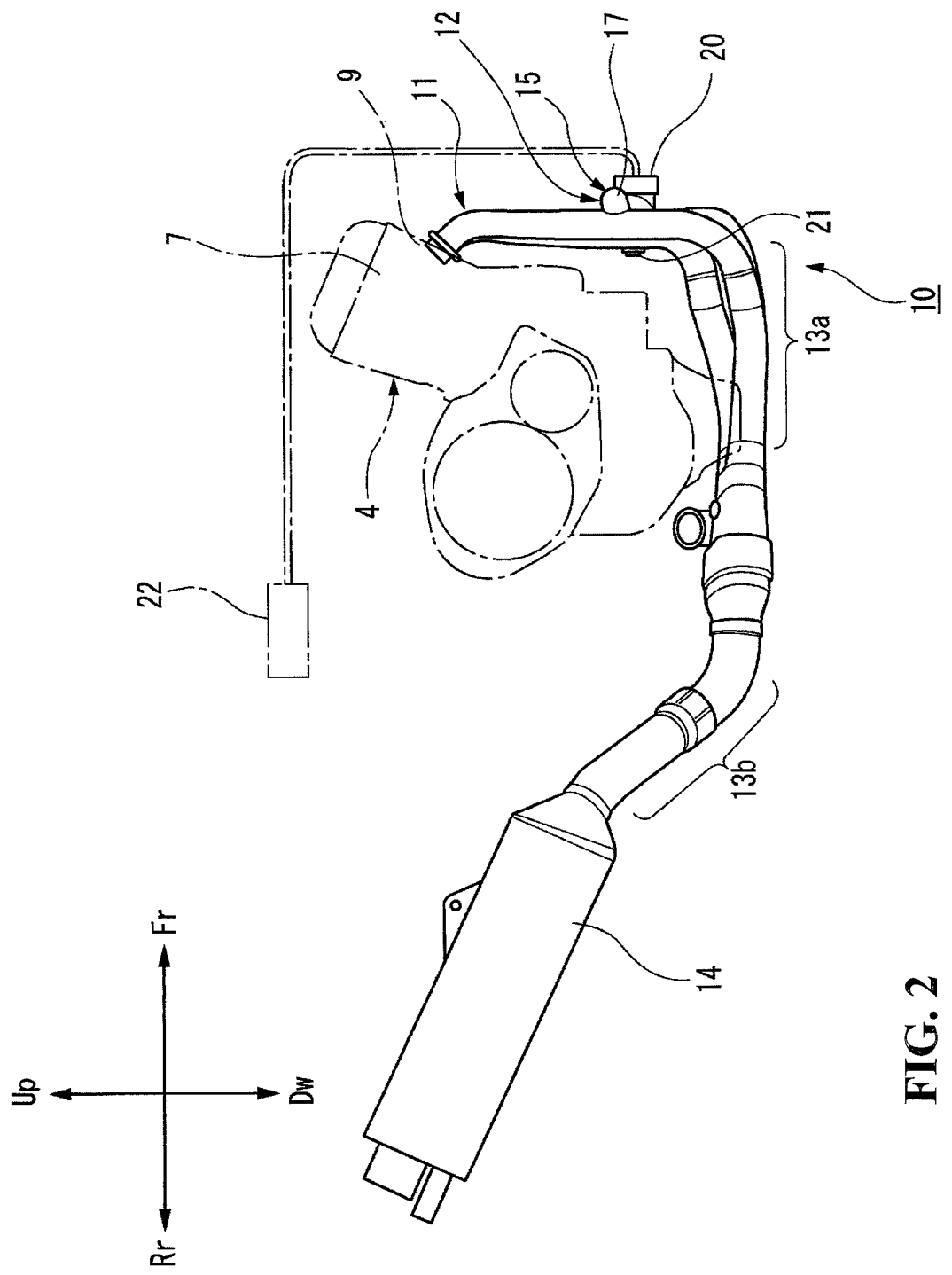
FIG. 2 is a schematic side elevational view showing the exhaust apparatus of the saddle type vehicle shown in FIG. 1.
Figure 3:
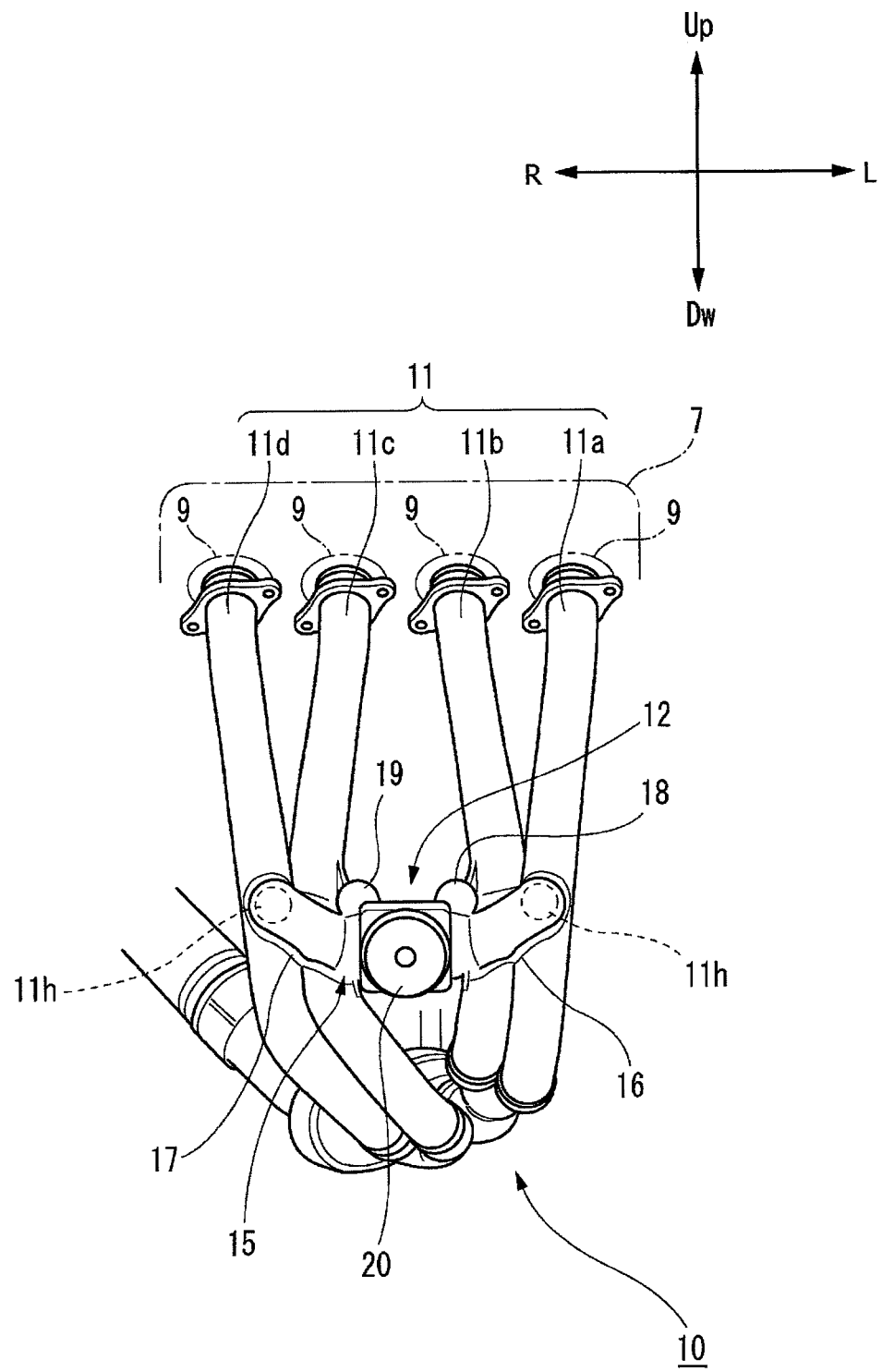
FIG. 3 is a schematic front elevational view of the exhaust apparatus of the saddle type vehicle shown in FIG. 1 as viewed in a direction from the front of the vehicle.

Intake/exhaust valves are accommodated in the cylinder head 7 and open and close intake/exhaust passages individually communicating with the cylinders in the cylinder block 6, and intake ports of the intake/exhaust passages are formed on the rear face of the cylinder head 7. Further, four exhaust ports 9 for the intake/exhaust passages are formed on the front face of the cylinder head 7 (refer to FIG. 3). An exhaust apparatus 10 includes an exhaust pipe 11 being connected to each exhaust port 9. As shown in FIGS. 2 and 3, the exhaust pipes 11 of the exhaust apparatus 10 extend forwardly and downwardly from the exhaust port 9 and have a first joining region 13a wherein the four exhaust paths are joined into two exhaust paths, for example, on the lower side of the cylinder head 7. Further, the exhaust pipes 11 are bent to the right and sidewardly of the cylinder head 7 and connect to a muffler 14 past a second joining region 13b at that the two exhaust paths are joined into one exhaust path.

Further, in the present embodiment, the exhaust pipes 11 extend independently of each other from the four exhaust ports 9 as seen in FIG. 3. In the region wherein the exhaust pipes 11 are independent of each other, a bypass section 12 is provided that communicates each two of the four exhaust pipes 11 (11a, 11b, 11c and 11d) with each other. An on-off valve 30 hereinafter described is provided in the bypass section 12 such that the exhaust characteristic of the engine 4 can be controlled by opening or closing the on-off valve 30.

Further, in the motorcycle 1 in the present embodiment, upper and side portions of the engine with respect to a vehicle body forward region (meter and headlamp region) are covered with a front cowl 60. The front cowl 60 includes a cowl lower portion 60a that covers forward and lower portions of the exhaust pipes 11 and is swollen to the neighborhood of the front wheel 47.

In the following, the exhaust apparatus 10 of the engine 4 in the present embodiment is described in detail.

Figure 4:
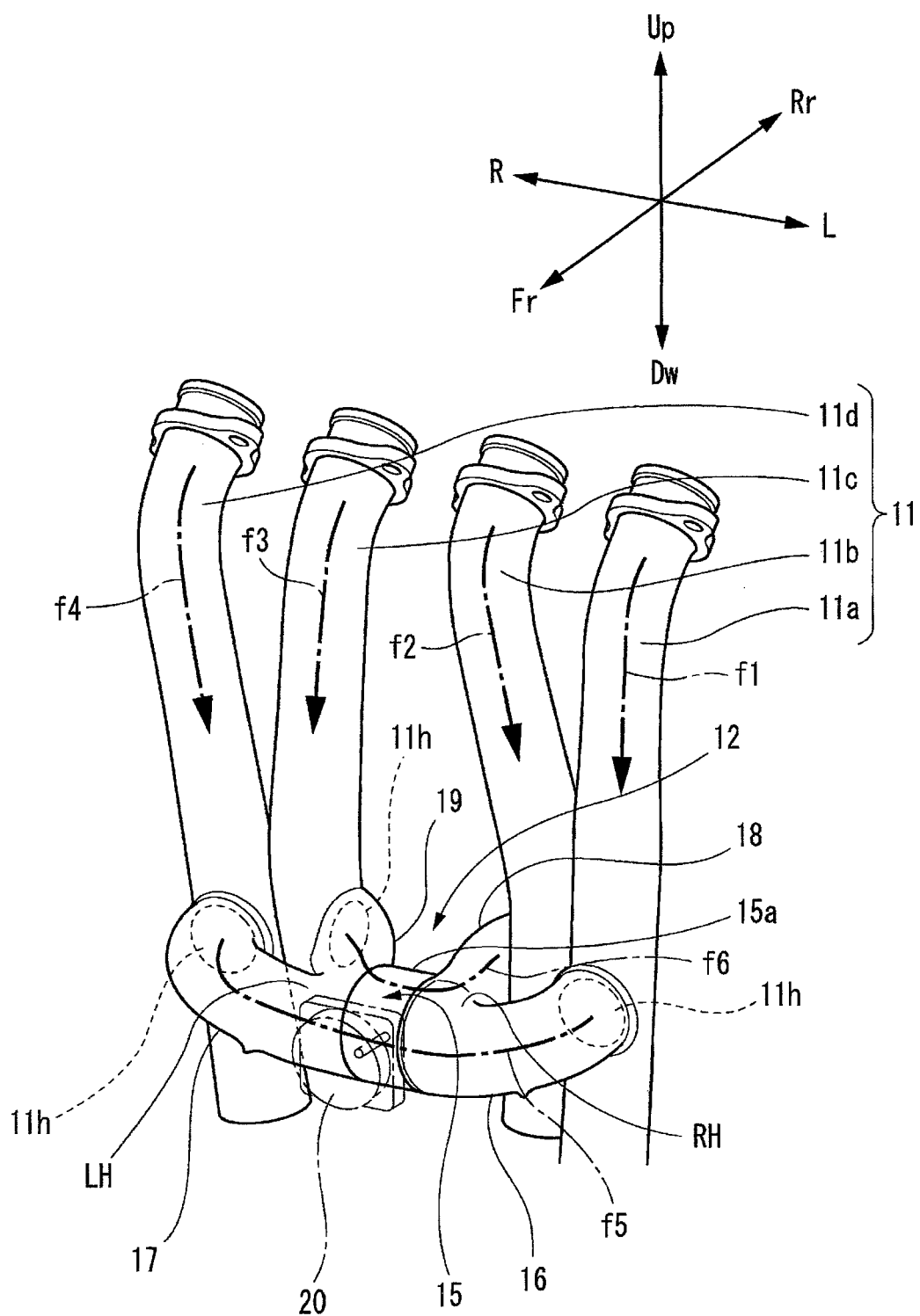
FIG. 4 is a partial perspective view of the exhaust apparatus of the first embodiment according to the present invention.

As shown in FIG. 4, in the exhaust apparatus 10 of the present embodiment, the first exhaust pipe 11a that forms an exhaust path f1, the second exhaust pipe 11b that forms another exhaust path f2, the third exhaust pipe 11c that forms a further exhaust path f3 and the fourth exhaust pipe 11d that configures a still further exhaust path f4 are connected to each other so as to form two the bypass paths f5 and f6 (refer to FIG. 6) at the bypass section 12. In particular, an opening 11h provided on a side face of the first exhaust pipe 11a and another opening 11h provided on a side face of the fourth exhaust pipe 11d are connected to each other through a bypass pipe 16 and another bypass pipe 17 so as to form the bypass path f5. In addition, a further opening 11h provided on a side face of the second exhaust pipe 11b and a still further opening 11h provided on a side face of the third exhaust pipe 11c are connected to each other through a bypass pipe 18 and another bypass pipe 19 so as to form the bypass path f6. The bypass paths f5 and f6 have, at a substantially central portion thereof, a bypass joining portion 15 at which they are positioned adjacent each other and extend in parallel to each other.

The bypass joining portion 15 of the bypass section 12 is a portion that interconnects a right side pipe portion RH formed from the bypass pipe 16 and the bypass pipe 18 on the right side in FIG. 4, and a left side pipe portion LH formed from the bypass pipe 17 and the bypass pipe 19 on the left side. This structure includes a circular pipe body portion 15a in the form of a circular pipe that interconnects the left and right side pipe portions LH and RH. The right side pipe portion RH and the left side pipe portion LH are structured such that partition inner walls 35 and 36 (refer to FIGS. 5 and 6) for forming the two bypass paths f5 and f6 configure a slit 40 (refer to FIGS. 5 and 6) substantially at the center of the circular pipe body portion 15a and the bypass paths f5 and f6 are positioned in a neighboring relationship and parallel to each other with the partition inner walls 35 and 36 sandwiched therebetween. In the slit 40, a single on-off valve 30 hereinafter described is disposed.

Figure 5:
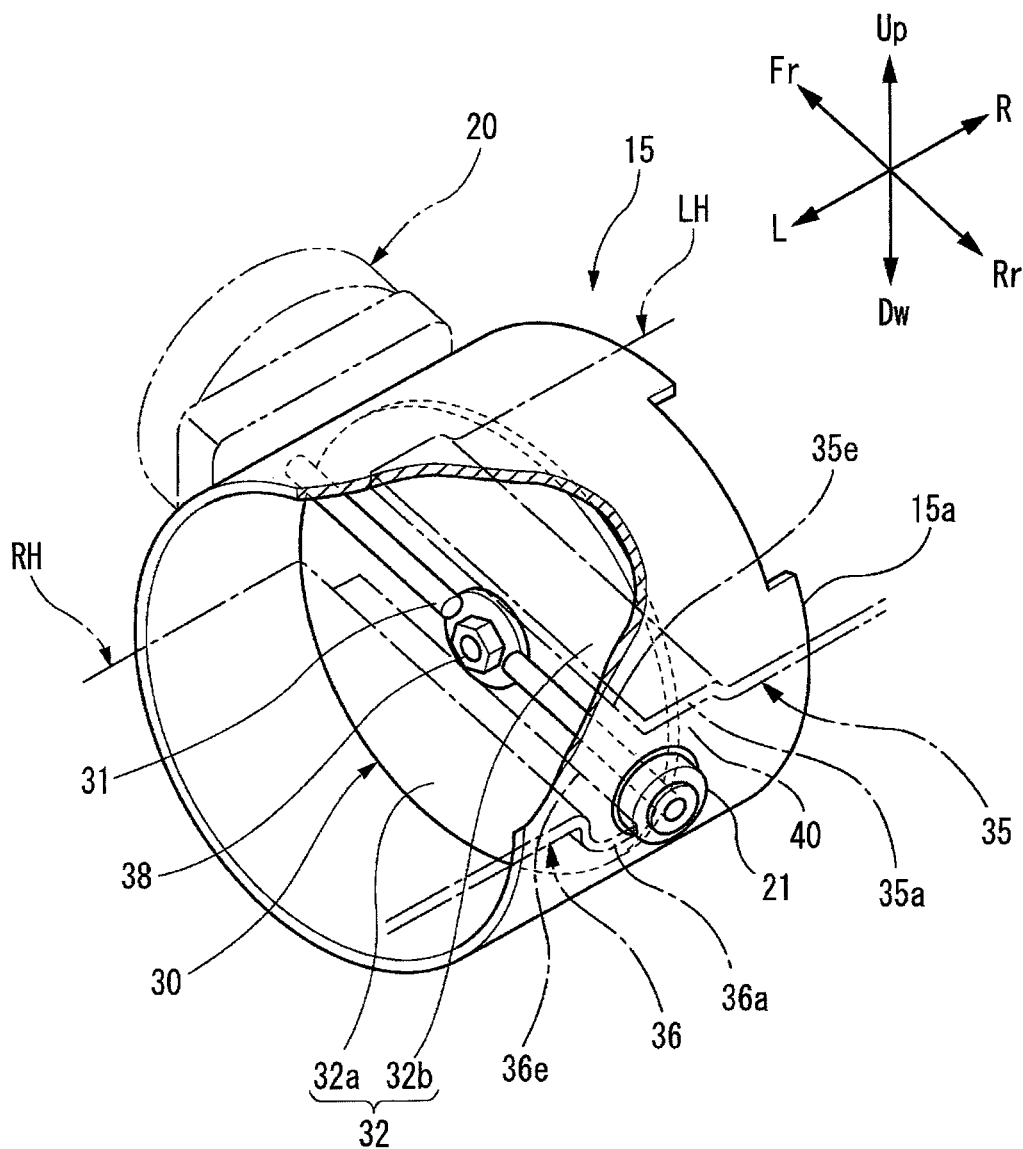
FIG. 5 is a perspective view partly in section of a circular pipe body portion in the first embodiment according to the present invention.

The bypass joining portion 15 in the present embodiment is configured such that the circular pipe body portion 15a interconnects the left and right side pipe portions LH and RH as described hereinabove. In particular, as shown in FIG. 5, the circular pipe body portion 15a includes an on-off valve 30 including a rotational shaft 31 that extends in a diametrical direction through the circular pipe body portion 15a. The on-off valve 30 is disposed for turning motion in the slit 40 formed by a partition inner wall 35 and another partition inner wall 36 (refer to FIG. 6).

Accordingly, the on-off valve 30 is disposed in the slit 40 such that the axial line of rotation of the rotational shaft 31 extends along the partition inner walls 35 and 36. Further, a flap portion 32 of the on-off valve 30 is configured in a simple shape of a disk corresponding to the inner diameter of the circular pipe body portion 15a. In this manner, the transverse sectional shape of the bypass paths f5 and f6 in the bypass joining portion 15 is a circular shape, and the flap portion 32 in the form of a disk corresponding to the circular shape is provided. This flap portion 32 is configured from a pair of flap portion halves 32a and 32b of a shape of a half disk disposed on the opposite sides of the rotational shaft 31. Both flap portion halves 32a and 32b are shaped such that they can open and close the bypass paths f5 and f6, respectively.

Accordingly, since the axial line of rotation of the rotational shaft 31 of the on-off valve 30 is provided along the partition inner wall, the single on-off valve 30 can open and close the bypass paths f5 and f6 individually by the flap portion halves 32a and 32b, respectively.

Further, in the present embodiment, since the bypass joining portion 15 that joins the bypass paths f5 and f6 to one place in this manner is provided, the single on-off valve 30 can open and close the bypass paths f5 and f6 at the same time, and consequently, a single actuator 20 can drive the rotational shaft 31 as well. As a result, only the single on-off valve 30 and the single actuator 20 can be used to open and close the two bypass paths f5 and f6, and the driving apparatus and the structure can be simplified.

Further, in the present embodiment, since the portion of the bypass joining portion 15 wherein the on-off valve 30 is provided is the circular pipe body portion 15a in the form of a circular pipe, the flap portion 32 of the on-off valve 30 can be formed in a simple shape of a disk corresponding to the shape of a transverse section of the circular pipe. Since the on-off structure portion of the on-off valve 30 can be formed in a shape of a disk having general versatility, it can be easily fabricated. Further, since the shape of the on-off structure portion of the on-off valve 30 is simple, it can be manufactured with a high degree of accuracy and a high closing performance of the bypass paths f5 and f6 can be readily maintained.

In the present embodiment, the flap portion 32 is attached to a central portion of the rotational shaft 31 in the lengthwise direction by a bolt 37 and a nut 38 that are fastening members as shown in FIG. 5. Further, the actuator 20 is mounted at one end portion of the rotational shaft 31, and a bearing portion 21 is provided at the other end portion of the rotational shaft 31.

Further, the actuator 20 is controlled suitably in response to the speed of rotation of the engine 4 by a control section 22 (refer to FIG. 2).

Further, in the present embodiment, the slit 40 is configured from a slit forming portion 35a formed by bending the partition inner wall 35 and a slit forming portion 36a formed by bending the partition inner wall 36, and is configured in such a manner so as not to contact with the rotational shaft 31. The on-off valve 30 is configured such that the flap portion 32 can closely contact with the partition inner walls 35 and 36 positioned on the opposite sides of the rotational shaft 31. In particular, in a fully open state (refer to FIG. 6) of the on-off valve 30, the flap portion half 32a contacts with the partition inner wall 35, and the flap portion half 32b contacts with the partition inner wall 36. Meanwhile, in a closed state of the on-off valve 30 (state of FIGS. 5 and 7), partition inner wall end edges 35e and 36e of the partition inner walls 35 and 36 are configured for contact with the flap portion halves 32a and 32b, respectively.

It is to be noted that, in the present embodiment, the partition inner wall 35 and the partition inner wall 36 positioned on the opposite sides of the rotational shaft 31 are provided such that they are displaced in the flap thicknesswise direction by a distance equal to the thickness (d) of the flap portion 32 (refer to FIG. 5). Since the partition inner walls 35 and 36 positioned on the opposite sides of the rotational shaft 31 are provided in a displaced relationship from each other in the flap thicknesswise direction by the distance corresponding to the thickness of the flap portion 32, only if the flap portion 32 and the partition inner walls 35 and 36 are configured so as to have flat faces parallel to each other, then the flap portion 32 and the partition inner walls 35 and 36 contact closely with each other when the on-off valve 30 is fully open.

Since the partition inner walls 35 and 36 that configure the slit 40 have the slit forming portions 35a and 36a that do not contact with the rotational shaft 31 in this manner, the partition inner walls 35 and 36 can be configured such that the partition inner wall end edges 35e and 36e thereof are disposed at a position wherein they do not interfere with fastening members for the rotational shaft 31 and the flap portion 32 but contact with the flap portion 32. Therefore, effective turning restriction of the on-off valve 30 can be carried out. Thus, a special member for restricting the rotational position of the on-off valve 30 can be eliminated and the configuration can be simplified.

Further, in the present embodiment, since the on-off valve 30 is configured such that, in the open state thereof, the flap portion 32 can contact closely with partition inner walls 35 and 36, it does not project into the bypass paths f5 and f6 and does not obstruct a flow of exhaust gas. In particular, since the axial line of rotation of the rotational shaft 31 of the flap portion 32 is positioned on the extension plane of the partition inner walls 35 and 36, in the open state of the on-off valve 30, the rotational shaft 31 and the flap portion 32 are positioned such that they extend along the partition inner walls 35 and 36. Consequently, a projecting structure that obstructs a flow of exhaust gas in the bypass paths f5 and f6 can be suppressed, and the flow of exhaust gas in the bypass paths f5 and f6 can be smoothened.

Further, since the slit 40 provided in the on-off valve 30 is closed by close contact of the flap portion 32 with the partition inner walls 35 and 36, the sealability of the bypass paths f5 and f6 is assured.

In the following, operation of the on-off valve 30 is described with reference to FIGS. 6 and 7.

Figure 6:
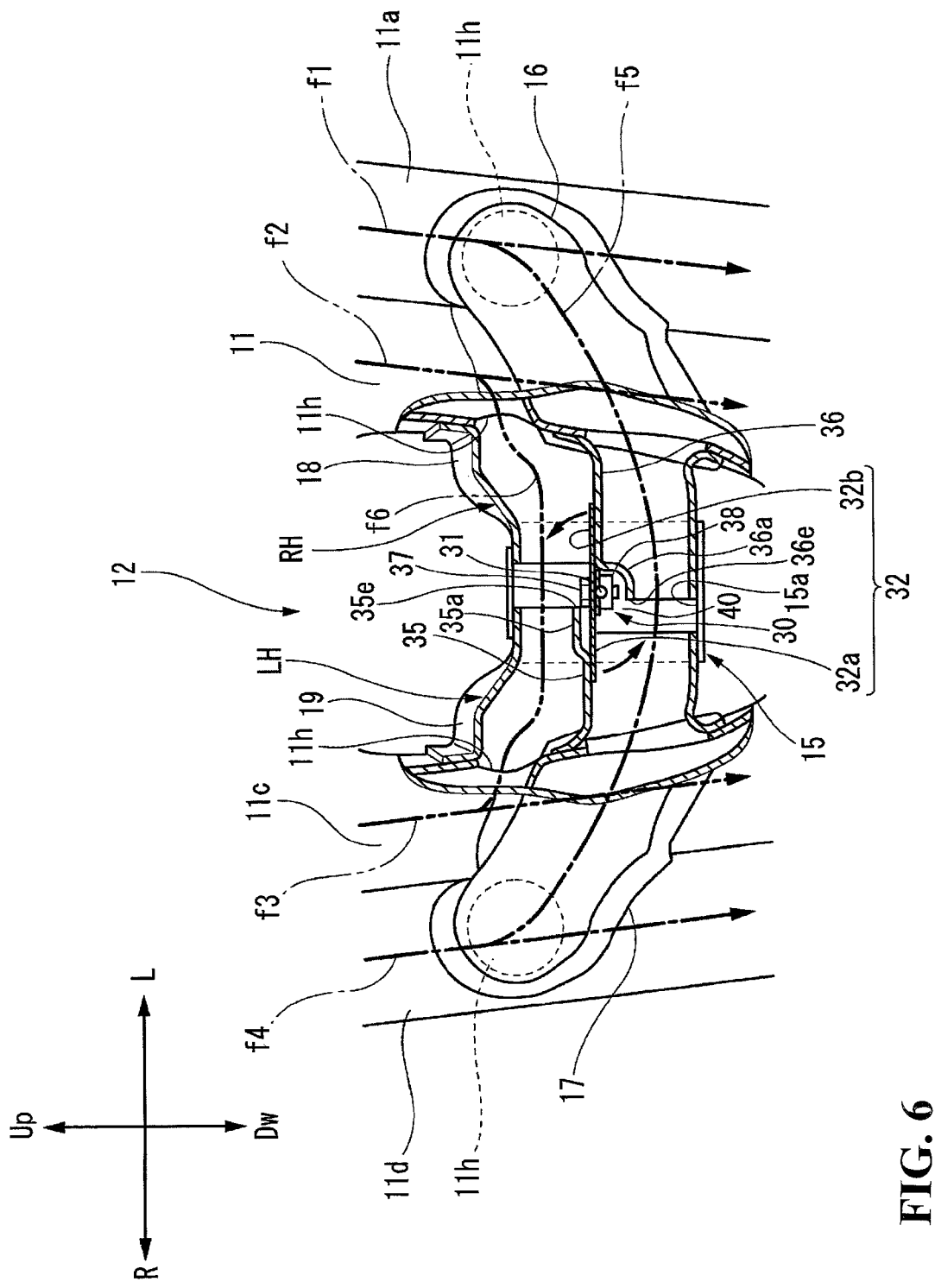
FIG. 6 is a schematic front elevational view partly in section illustrating an open state of an on-off valve in the exhaust apparatus shown in FIG. 1.

First, the fully open state of the on-off valve 30 shown in FIG. 6 is described.

In the fully open state of the on-off valve 30, the flap portion half 32a of the flap portion 32 closely contacts with the wall face of the partition inner wall 35 while the other flap portion half 32b closely contacts with the wall face of the partition inner wall 36. In this state, the first exhaust pipe 11a and the fourth exhaust pipe 11d are communicated with each other to form the bypass path f5 while the second exhaust pipe 11b and the third exhaust pipe 11c are communicated with each other to form the bypass path f6. Such communication of the bypass paths f5 and f6 is carried out by driving the actuator 20 by a signal of the control section 22, for example, when the rotational speed is in a low or middle speed region.

Figure 7:
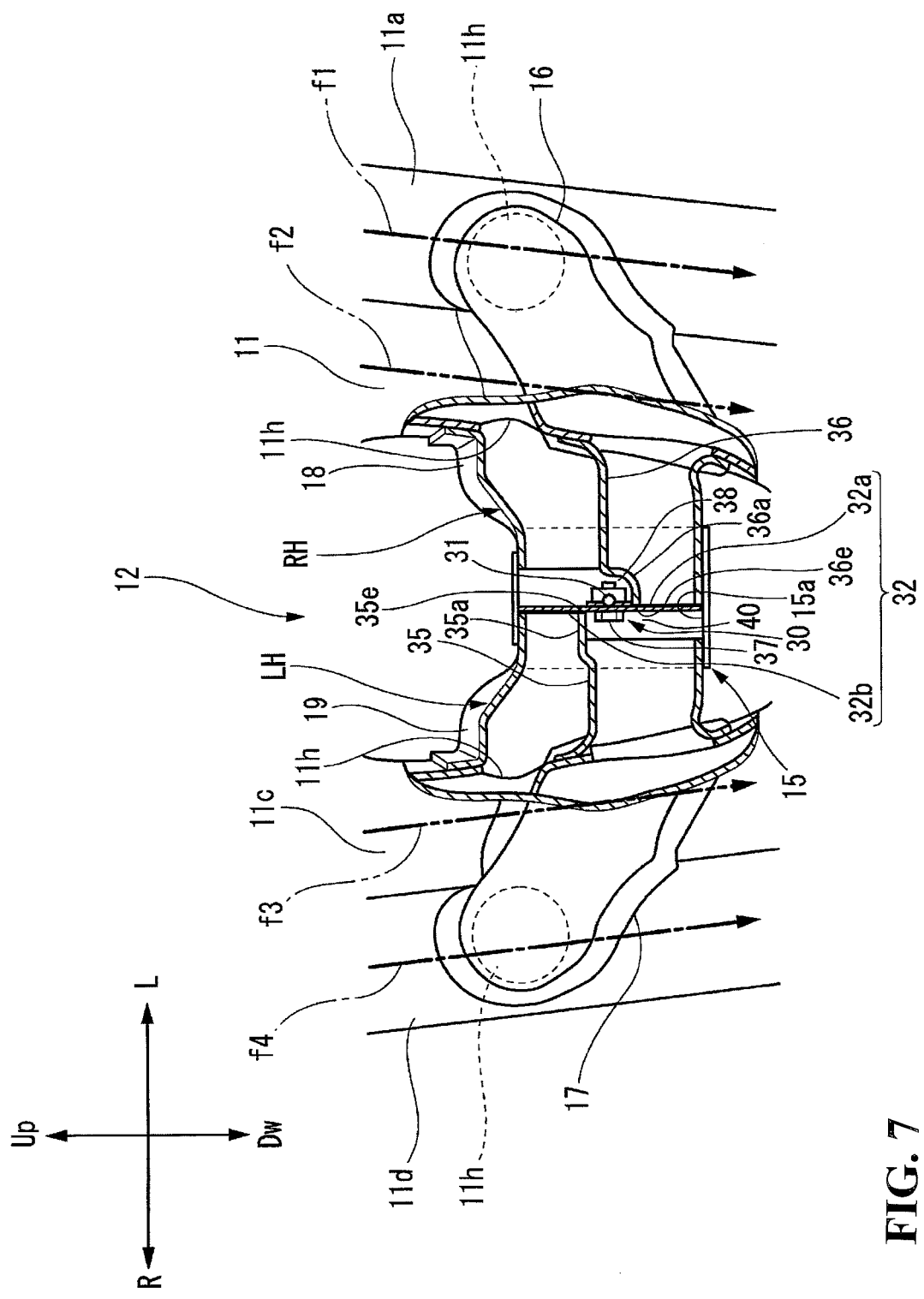
FIG. 7 is a schematic front elevational view partly in section illustrating a closed state of the on-off valve in the exhaust apparatus shown in FIG. 1.

Now, a state shown in FIG. 7 in that the on-off valve 30 is closed is described.

The rotational shaft 31 of the on-off valve 30 is rotated (rotation in the counterclockwise direction in FIG. 6) by operation of the actuator 20. By this movement, the flap portion 32 and the partition inner wall end edges 35e and 36e are brought into contact with each other and the rotation of the on-off valve 30 is stopped. In this closed state of the on-off valve 30, the flap portion 32 and the partition inner wall end edges 35e and 36e contact with each other so that the position of the on-off valve 30 is restricted in the closed state of the bypass paths f5 and f6. Further, since, in the closed state, the flap portion 32 and the partition inner wall end edges 35e and 36e contact with each other, also the sealability between the bypass paths f5 and f6 is assured. In this manner, the no-communication state of the bypass paths f5 and f6 is established by driving the actuator 20 by a signal of the control section 22, for example, when the rotational speed is in a high speed region.

In the following, a second embodiment of the present invention is described with reference to FIGS. 8 and 9.

Figure 8:
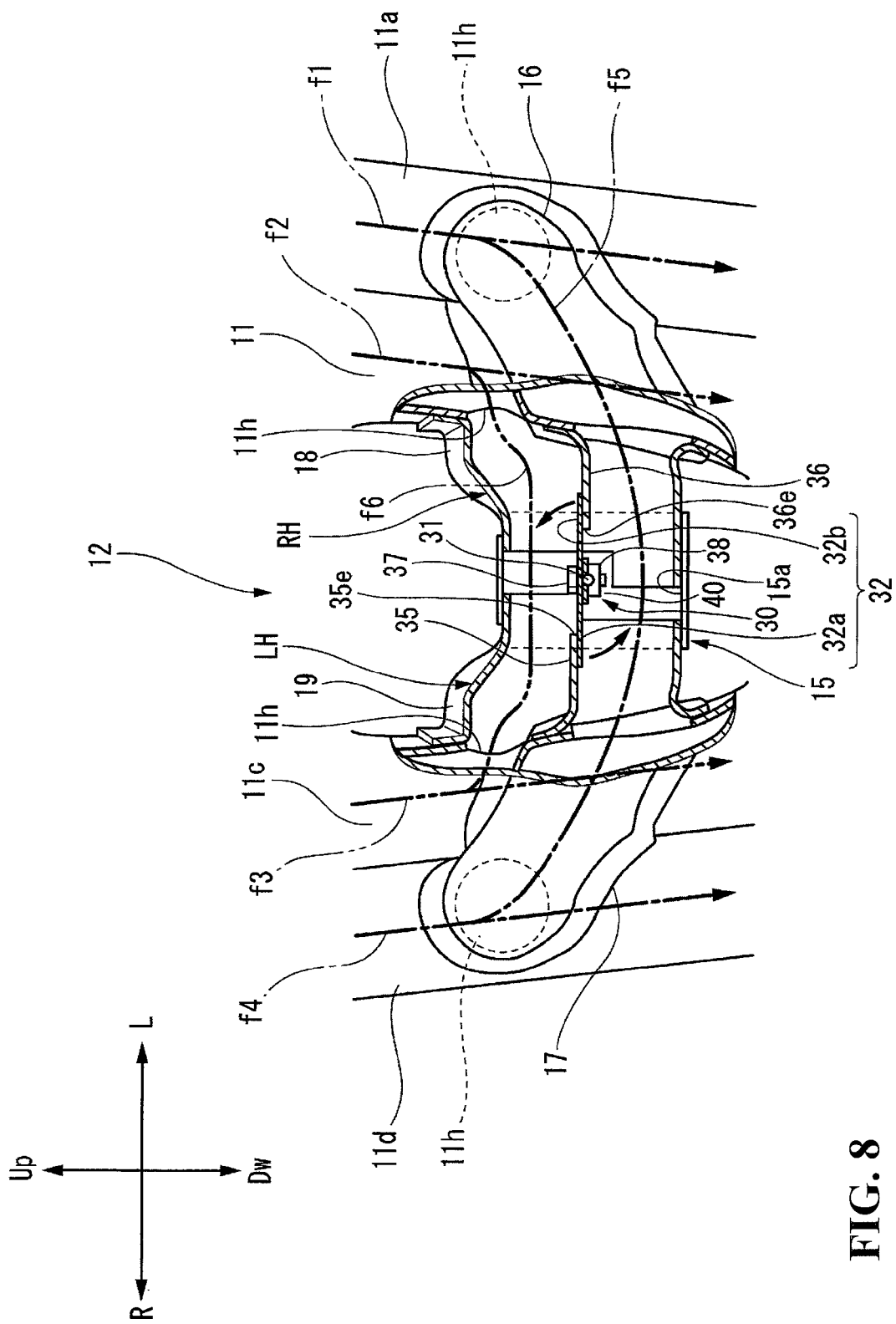
FIG. 8 is a schematic front elevational view partly in section illustrating an open state of an on-off valve in an exhaust apparatus of a second embodiment according to the present invention.
Figure 9:
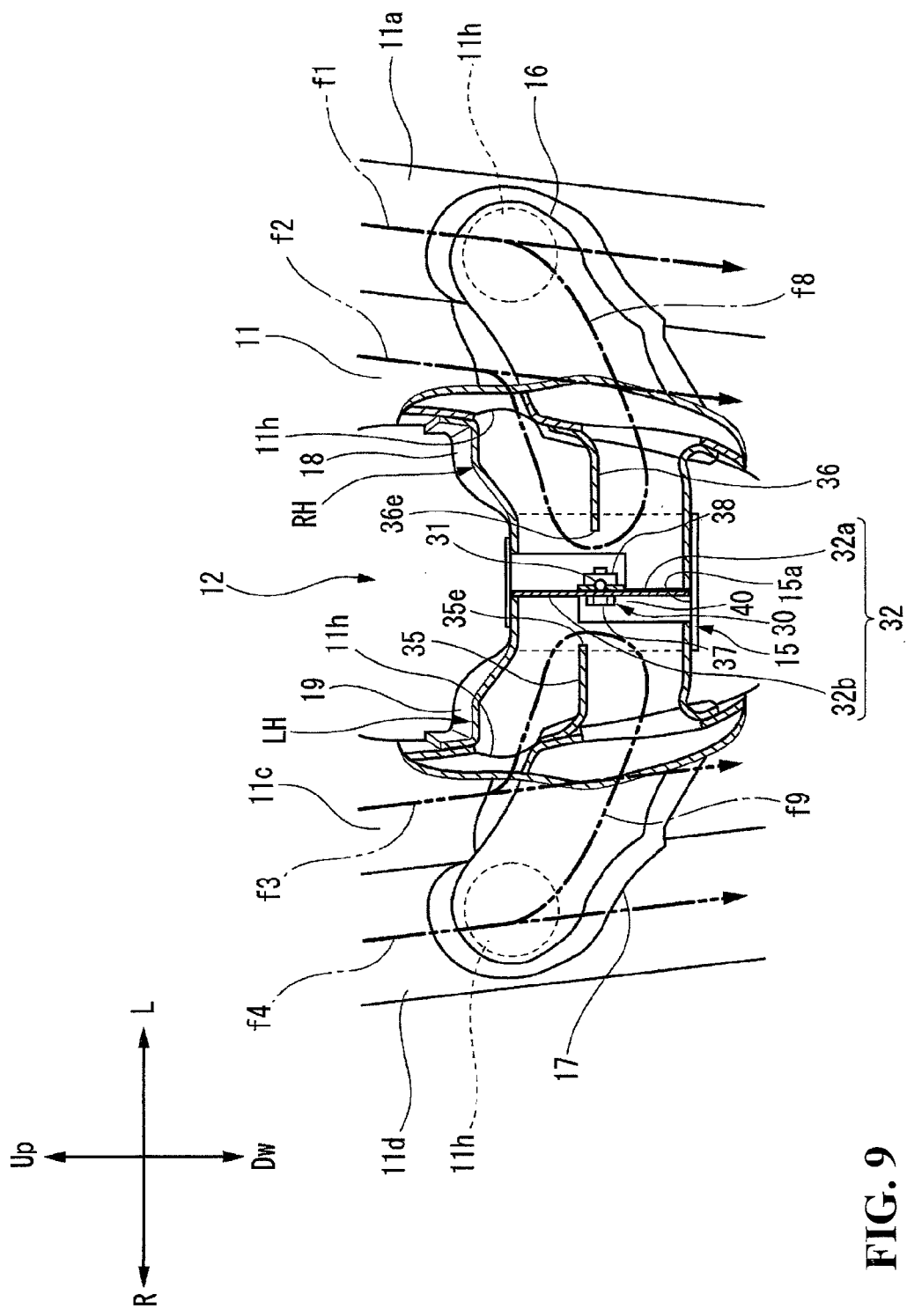
FIG. 9 is a schematic front elevational view partly in section illustrating a closed state of the on-off valve in the exhaust apparatus of the second embodiment according to the present invention.

It is to be noted that the configuration shown in FIGS. 8 and 9 is similar to that of the first embodiment described hereinabove except the structure of the partition inner walls. Accordingly, like components to those of the first embodiment are denoted by like reference characters, and overlapping description of them is omitted herein.

The on-off valve 30 in the present embodiment is similar in the configuration that the rotational shaft 31 is positioned in the slit 40 of the partition inner walls 35 and 36. However, the on-off valve 30 is configured such that the partition inner wall end edges 35e and 36e that configure the slit 40 and the flap portion 32 do not contact with each other. In particular, as shown in FIG. 9, the on-off valve 30 is structured such that, in the closed state of the on-off valve 30, the partition inner wall end edges 35e and 36e and the flap portion 32 are spaced from each other.

In the following, operation of the on-off valve 30 is described.

First, a fully open state of the on-off valve 30 is described with reference to FIG. 8.

In the fully open state of the on-off valve 30, the flap portion half 32a of the flap portion 32 closely contacts with the wall face of the partition inner wall 35 while the other flap portion half 32b closely contacts with the wall face of the partition inner wall 36. In this fully open state, the first exhaust pipe 11a and the fourth exhaust pipe 11d are communicated with each other to form the bypass path f5 while the second exhaust pipe 11b and the third exhaust pipe 11c are communicated with each other to form the bypass path f6.

Now, a closed state of the on-off valve 30 is described with reference to FIG. 9.

The rotational shaft 31 of the on-off valve 30 is rotated (rotation in the counterclockwise direction in FIG. 8) by operation of the actuator 20, and stops at a position wherein the rotational shaft 31 becomes perpendicular to the partition inner walls 35 and 36. In this closed state of the on-off valve 30, the bypass paths f5 and f6 exhibit a closed state. On the other hand, a new bypass path f8 and another new bypass path f9 are formed. In particular, the bypass path f8 that communicates the first exhaust pipe 11a and the second exhaust pipe 11b with each other and the bypass path f9 that communicates the third exhaust pipe 11c and the fourth exhaust pipe 11d are formed.

In this manner, in the present embodiment, different from the first embodiment, in the closed state of the on-off valve 30 in the first embodiment, the flap portion 32 and the partition inner walls 35 and 36 are spaced away from each other. Therefore, a new open state in that the communication form of the bypass paths is changed can be formed. By such a very simple and easy configuration, communication between the different exhaust pipes can be established thereby to change the exhaust characteristic readily by operation of the on-off valve 30.

In the following, a third embodiment of the present invention is described with reference to FIGS. 10 to 12.

Figure 10:
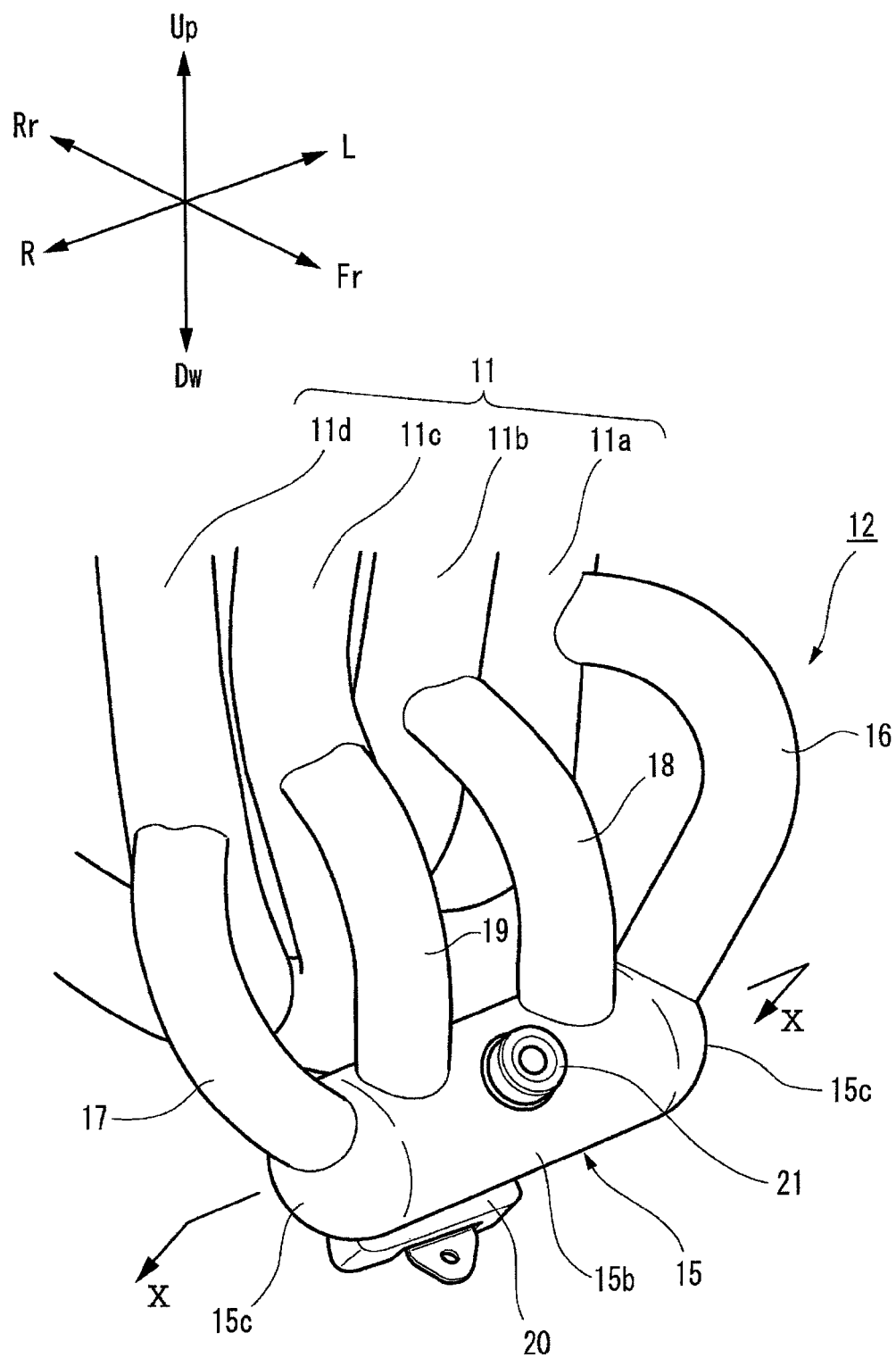
FIG. 10 is a partial perspective view of an exhaust apparatus of a third embodiment according to the present invention.
Figure 11:
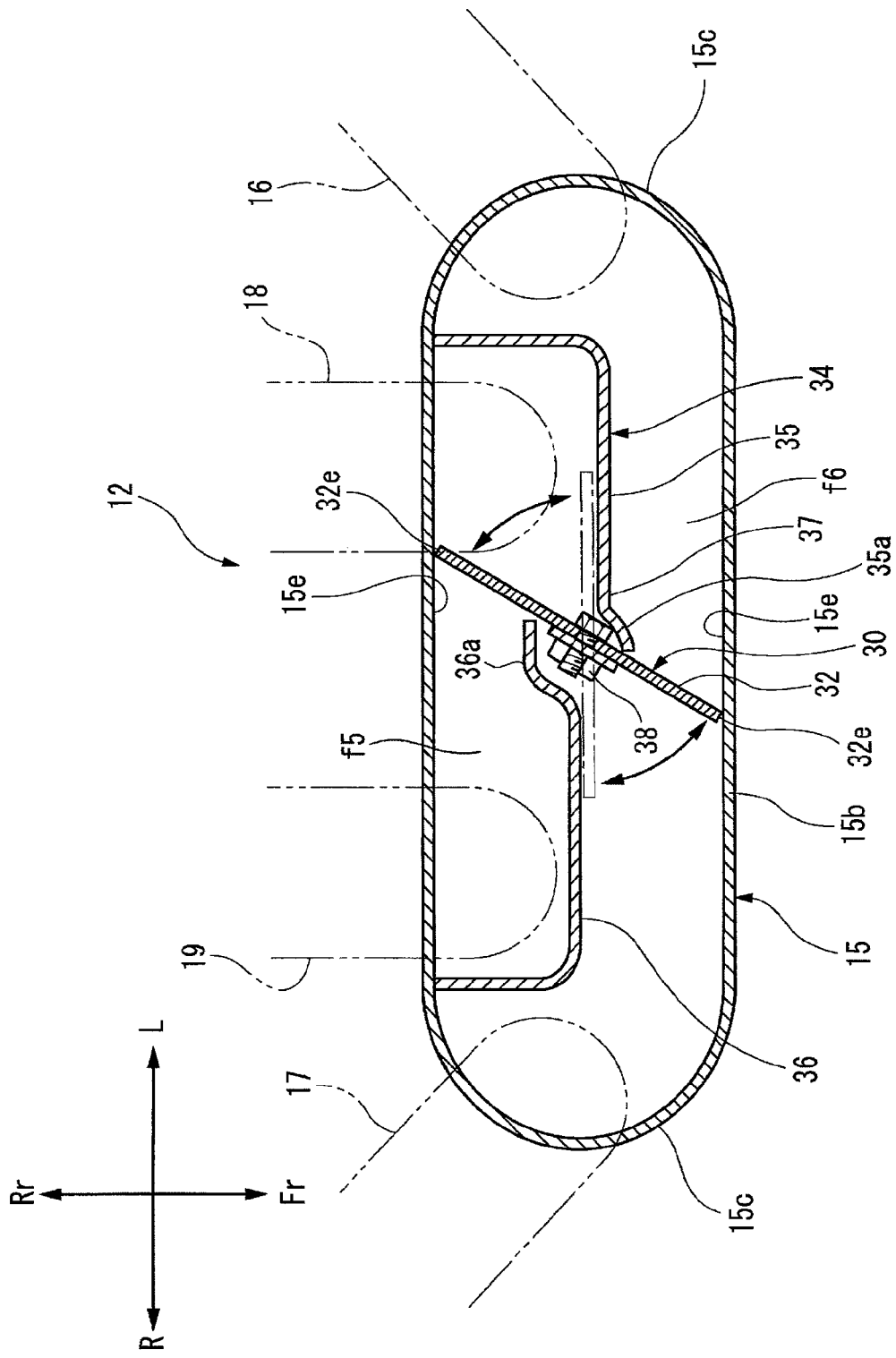
FIG. 11 is a sectional view taken along line X-X of FIG. 10.
Figure 12:
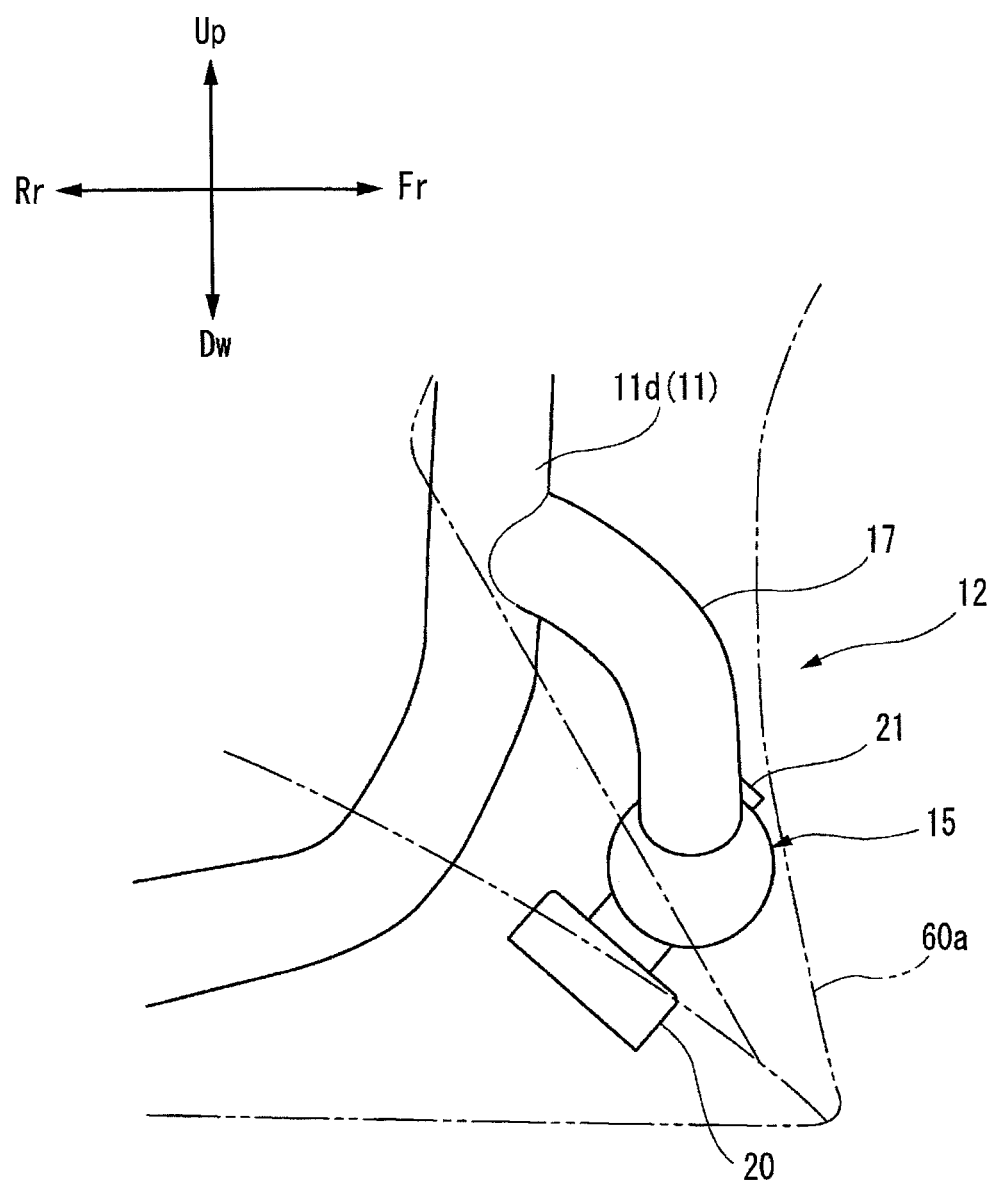
FIG. 12 is a schematic partial side elevational view of a saddle type vehicle illustrating an installation position of the exhaust apparatus of the third embodiment according to the present invention.

It is to be noted that the configuration shown in FIGS. 10 to 12 is similar to that of the first embodiment described hereinabove except the structure of the bypass section 12. Accordingly, overlapping description of the common components is omitted herein.

In the present embodiment, the bypass section 12 is provided that is swollen by a great amount forwardly of the vehicle body from the first exhaust pipe 11a, second exhaust pipe 11b and third exhaust pipe 11c and fourth exhaust pipe 11d. The bypass pipes 16, 17, 18 and 19 of the bypass section 12 are configured such that they extend forwardly and downwardly by a great amount in comparison with those in the first embodiment. Further, the bypass joining portion 15 is disposed in the proximity of a lowermost end of the vehicle on the front side of the exhaust pipe 11 as seen in FIG. 12. The bypass section 12 is covered with the cowl lower portion 60a of the front cowl 60. Further, the actuator 20 in the present embodiment is attached to the lower side of the bypass joining portion 15.

In the present embodiment, the bypass joining portion 15 is configured from a central tubular portion 15b of a cylindrical shape, and a pair of opposite hemispherical portions 15c, 15c at the opposite ends of the central tubular portion 15b. Two partition inner walls 35 and 36 are provided in the bypass joining portion 15 to form two chambers as seen in FIG. 11. The partition inner walls 35 and 36 form the bypass path f5 that communicates the bypass pipe 18 and the bypass pipe 19 connected to the central tubular portion 15b with each other and the bypass path f6 that communicates the bypass pipe 16 and the bypass pipe 17 connected to the opposite hemispherical portions 15c, 15c with each other. Further, the on-off valve 30 is provided between the partition inner walls 35 and 36.

In the present embodiment, the flap portion 32 has a disk shape in the form of a flat plate. When the flap portion 32 is positioned such that flat outer edges 32e thereof contact with the inner face 51e of the central tubular portion 15b (state illustrated in FIG. 11), the bypass paths f5 and f6 are closed. On the other hand, if the flap portion 32 is rotated by the actuator 20, then the flap portion 32 is closely contacted with the partition inner walls 35 and 36 (this state is indicated by an imaginary line in FIG. 11) to allow the bypass paths f5 and f6 to communicate with each other.

It is to be noted that, in opening and closing of the flap portion 32 in the present embodiment, the operation angle of the flap portion 32 is set to such a low value as approximately 45 degrees. In this instance, since the operation amount is small, changeover can be carried out rapidly.

Further, in the present embodiment, since the four bypass pipes are configured long, an exhaust characteristic different from that of the first embodiment can be anticipated.

In the following, a fourth embodiment of the present invention is described with reference to FIG. 13.

Figure 13:
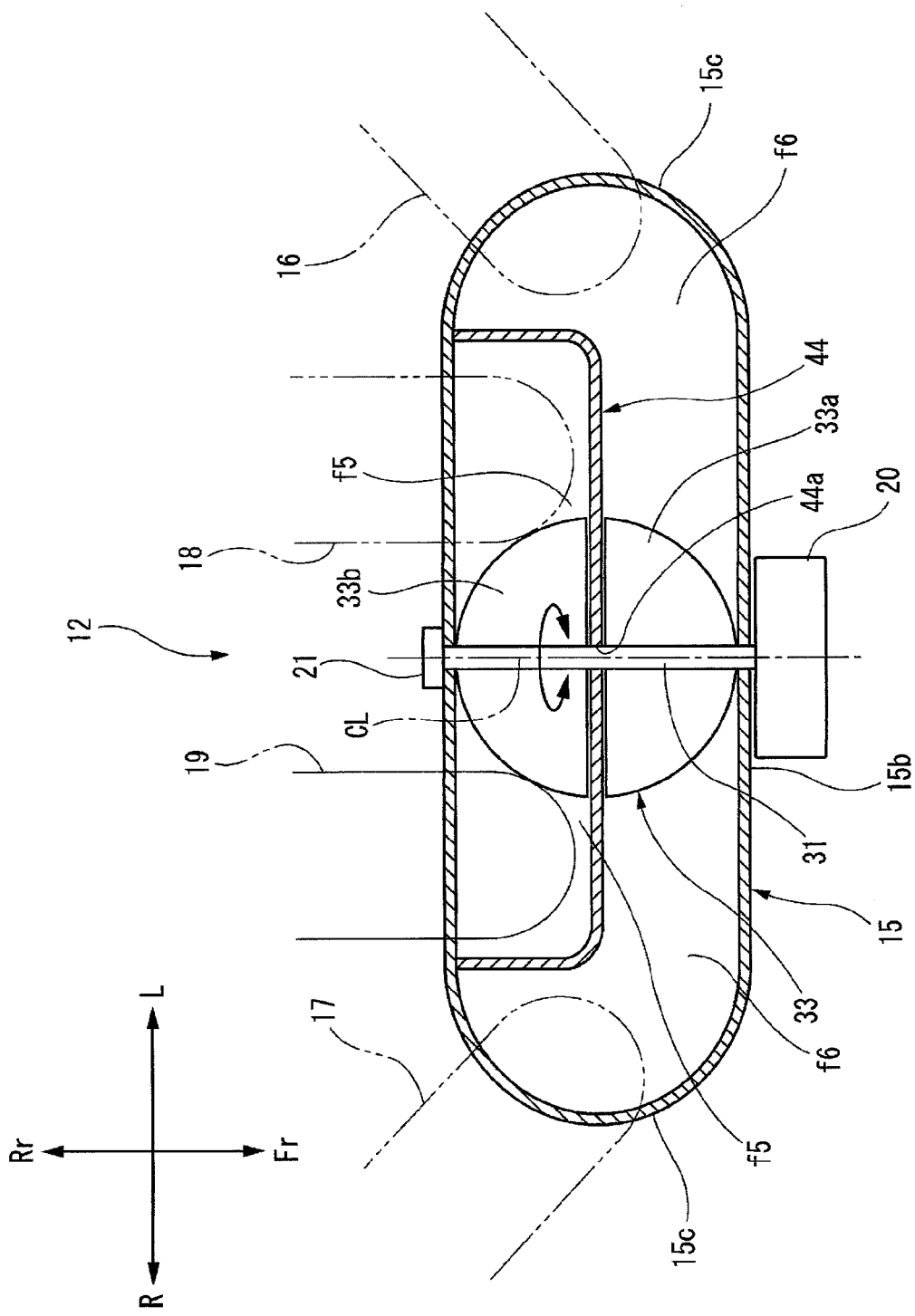
FIG. 13 is a partial sectional view of a fourth embodiment according to the present invention.

It is to be noted that the configuration shown in FIG. 13 is similar in structure to that of the third embodiment except the structure of the on-off valve 33. Accordingly, like components to those of the third embodiment are denoted by like reference characters and overlapping description of them is omitted herein.

In the present embodiment, the rotational shaft 31 of the on-off valve 33 is disposed such that it extends through a through-hole 44a in a direction perpendicular to a single partition inner wall 44 that configures the bypass paths f5 and f6, and crosses the bypass paths f5 and f6. Further, two semicircular flap portions 33a and 33b are provided on the rotational shaft 31 such that they are spaced away from each other in the direction of the axial line CL of rotation. The actuator 20 is connected to one end side of the rotational shaft 31. Thus, the bypass paths f5 and f6 are configured such that they have an open state provided by rotation of the semicircular flap portions 33a and 33b (state illustrated in FIG. 13) and a closed state established by rotation by 90 degrees from the open position.

Since the rotational shaft 31 of the on-off valve 33 is provided such that it extends through the partition inner wall 44 in a direction in that the axial line CL of rotation thereof crosses with the partition inner wall 44 in this manner, the two flap portions 33a and 33b can be operated by the single rotational shaft 31. In addition, the rotational shaft 31 is configured so as to extend through the partition inner wall 44. Therefore, the closed nature of the bypass paths f5 and f6 formed by the partition inner wall 44 can be assured readily and the independence of the bypass paths f5 and f6 can be maintained readily.

Further, according to the on-off valve 33 in the present embodiment, where the engine has a greater number of exhaust pipes, also it is possible to provide three or more flap portions, and even if three or more bypass paths are involved, on-off control of the bypass paths can be carried out by a single on-off valve.

Further, in the case of a configuration wherein the rotational shaft 31 of the on-off valve 33 extends through the bypass paths f5 and f6 as in the present embodiment, if, for example, the bypass joining portion 15 that forms the bypass paths f5 and f6 is disposed such that, different from the structure shown in FIG. 13, two bypass pipes contact with each other at a predetermined place, then the rotational shaft 31 can be provided. Thus, even in the case of a structure wherein a plurality of bypass paths are not juxtaposed in parallel to each other, simultaneous on-off control of the bypass paths is possible.

While the embodiments of the present invention described above are directed to a four-cylinder engine, the present invention is not limited to this. Further, while, in the flap portion 32 presented in the first embodiment described hereinabove (FIGS. 5 to 7), the flap portion halves 32a and 32b have a shape of a disk positioned on the same plane, the flap portion 32 may otherwise have a structure wherein the flap portion half 32a and the flap portion half 32b across the rotational shaft 31 may have an offset therebetween. In particular, in the case where the partition inner walls 35 and 36 positioned on the opposite sides of the rotational shaft 31 are disposed on the same plane, the flap portion 32 may have a structure wherein the flap portion halves 32a and 32b are bent so as to be displaced from each other by a distance equal to the thickness of the partition inner walls 35 and 36 thereby to assure the close contactness of the flap portion halves 32a and 32b with the partition inner walls 35 and 36, respectively. Further, while, in the embodiment described hereinabove, the flap halves have a same semicircular shape, in the present invention, the shapes of the flap halves may not be a semicircular shape but may be any shape only if they correspond to the shape of the cross section of the bypass paths. Alternatively, the flap halves may have different shapes from each other.

Further, while the embodiments described hereinabove are directed to a motorcycle, the fuel supplying structure for a saddle type vehicle according to the present invention can be applied also to other saddle type vehicles having three wheels or four wheels.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust apparatus for an internal combustion engine, comprising:
   a plurality of exhaust pipes extending independently from each other individually from a plurality of exhaust ports; and
   a bypass section that communicates the exhaust pipes with each other in a region wherein the exhaust pipes are independent of each other;
   the bypass section being opened or closed to control an exhaust characteristic, the bypass section comprising:
   a plurality of bypass paths;
   a bypass joining section wherein the bypass paths are joined to be positioned parallel to and adjacent to each other;
   a single on-off valve positioned at the bypass joining section, said single on-off valve having a center of rotation positioned on a boundary between the bypass paths and configured to open and close the bypass paths simultaneously; and
   a single actuator operatively connected to the single on-off valve for selectively driving the on-off valve to an open and a closed position.

2. The exhaust apparatus for an internal combustion engine according to claim 1, wherein a partition inner wall is provided in the inside of the bypass joining section to form the bypass paths; and
   the on-off valve includes a flap portion corresponding to a shape of a cross section of the bypass paths and a single rotational shaft for rotating the flap portion.

3. The exhaust apparatus for an internal combustion engine according to claim 2, wherein the flap portion includes a pair of flap portion halves disposed on the opposite sides across the rotational shaft; and
   the flap portion halves individually correspond for opening and closing movement to the bypass paths.

4. The exhaust apparatus for an internal combustion engine according to claim 2, wherein the bypass joining section includes a circular pipe body portion in the form of a cylindrical pipe; and
   the flap portion is formed as a disk corresponding to an inner diameter of the circular pipe body portion.

5. The exhaust apparatus for an internal combustion engine according to claim 2, wherein the rotational shaft of the on-off valve is disposed in the slit of the partition inner walls; and
   the partition inner wall end edges that configure the slit and the flap portion of the on-off valve are spaced away from each other in a closed state of the on-off valve.

6. The exhaust apparatus for an internal combustion engine according to claim 2, wherein the rotational shaft of the on-off valve is positioned on an extension plane of the two partition inner walls provided in a juxtaposed relationship from each other.

7. The exhaust apparatus for an internal combustion engine according to claim 6, wherein the partition inner wall has a slit formed from partition inner wall end edges;
   the rotational shaft is disposed in the slit; and
   the flap portion and the partition inner wall end edges contact with each other in a state wherein the on-off valve is closed.

8. The exhaust apparatus for an internal combustion engine according to claim 7, wherein the partition inner wall end edges are provided at an end of bent or curved slit forming portions that do not contact with the rotational shaft.

9. The exhaust apparatus for an internal combustion engine according to claim 7, wherein the flap portion of the on-off valve is configured for close contact with the partition inner walls positioned on the opposite sides of the rotational shaft.

10. The exhaust apparatus for an internal combustion engine according to claim 9, wherein the partition inner walls positioned on the opposite sides of the rotational shaft are provided in a spaced relationship from each other by an amount corresponding to the thickness of the flap portion in a thicknesswise direction.

11. An exhaust apparatus for an internal combustion engine, comprising:
    a plurality of exhaust pipes extending independently from each other individually from a plurality of exhaust ports; and
    a bypass section that communicates the exhaust pipes with each other in a region wherein the exhaust pipes are independent of each other;
    the bypass section being opened or closed to control an exhaust characteristic, the bypass section comprising:
    a plurality of bypass paths;
    a bypass joining section wherein the bypass paths are joined to be adjacent with each other;
    a single on-off valve configured to open and close the bypass paths simultaneously, said single on-off valve being positioned at the bypass joining section;
    a single actuator operatively connected to the single on-off valve for selectively driving the on-off valve to an open and a closed position;
    a partition inner wall formed inside of the bypass joining section wherein the bypass paths are formed inside of the bypass joining section; and
    the on-off valve includes flap portions in the form of a plate that correspond to a shape of a cross section of the bypass paths and open and close the bypass paths and a single rotational shaft for rotating the flap portions, and the rotational shaft is provided to extend through the partition inner wall in a direction crossing with the partition inner wall.

12. The exhaust apparatus for an internal combustion engine according to claim 11, wherein the bypass joining section includes a circular pipe body portion in the form of a cylindrical pipe; and
    the flap portion is formed as a disk corresponding to an inner diameter of the circular pipe body portion.

13. The exhaust apparatus for an internal combustion engine according to claim 11, wherein the rotational shaft of the on-off valve is disposed in the slit of the partition inner walls; and the partition inner wall end edges that configure the slit and the flap portion of the on-off valve are spaced away from each other in a closed state of the on-off valve.

14. The exhaust apparatus for an internal combustion engine according to claim 11, wherein the flap portion includes a pair of flap portion halves disposed on the opposite sides across the rotational shaft; and the flap portion halves individually correspond for opening and closing movement to the bypass paths.

15. The exhaust apparatus for an internal combustion engine according to claim 14, wherein the rotational shaft of the on-off valve is disposed in the slit of the partition inner walls; and the partition inner wall end edges that configure the slit and the flap portion of the on-off valve are spaced away from each other in a closed state of the on-off valve.

16. The exhaust apparatus for an internal combustion engine according to claim 11, wherein the rotational shaft of the on-off valve is positioned on an extension plane of the two partition inner walls provided in a juxtaposed relationship from each other.

17. The exhaust apparatus for an internal combustion engine according to claim 16, wherein the partition inner wall has a slit formed from partition inner wall end edges;

the rotational shaft is disposed in the slit; and the flap portion and the partition inner wall end edges contact with each other in a state wherein the on-off valve is closed.

18. The exhaust apparatus for an internal combustion engine according to claim 17, wherein the partition inner wall end edges are provided at an end of bent or curved slit forming portions that do not contact with the rotational shaft.

19. The exhaust apparatus for an internal combustion engine according to claim 17, wherein the flap portion of the on-off valve is configured for contact with the partition inner walls positioned on the opposite sides of the rotational shaft.

20. The exhaust apparatus for an internal combustion engine according to claim 19, wherein the partition inner walls positioned on the opposite sides of the rotational shaft are provided in a spaced relationship from each other by an amount corresponding to the thickness of the flap portion in a thicknesswise direction.

* * * * *